(12) United States Patent
Ishimoto et al.

(10) Patent No.: US 6,226,455 B1
(45) Date of Patent: *May 1, 2001

(54) SHOOTING APPARATUS (75) Inventors: Kouichi Ishimoto, Nara; Hiroaki Kimura, Osaka; Kenta Fujimoto, Osaka; Hamao Horiguchi, Osaka; Shigekazu Matsumoto, Osaka; Kazukuni Hiraoka, Osaka, all of (JP)

(73) Assignee: SNK Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/983,344
(22) PCT Filed: Feb. 18, 1997
(86) PCT No.: PCT/JP97/00430
  § 371 Date: Aug. 6, 1998
  § 102(e) Date: Aug. 6, 1998
(87) PCT Pub. No.: WO98/10331
  PCT Pub. Date: Mar. 12, 1998

(30) Foreign Application Priority Data

Sep. 2, 1996 (JP) .................................................. 8-008863
Sep. 10, 1996 (JP) .................................................. 8-009151

(51) Int. Cl.[7] .................................................. G03B 15/00
(52) U.S. Cl. .................................................. 396/2; 396/3; 348/584; 348/586
(58) Field of Search .................................. 396/1, 2, 3, 4; 348/77, 222, 231, 232, 61, 578, 584, 586; 700/90

(56) References Cited

U.S. PATENT DOCUMENTS

| 4,864,410 | 9/1989 | Andrews et al. . |
| 5,109,281 | 4/1992 | Kobori et al. . |

(List continued on next page.)

FOREIGN PATENT DOCUMENTS

| 0 461 147 B1 | 12/1991 | (EP) | G03B/17/53 |
| 2242592 | 10/1991 | (GB) . | |

(List continued on next page.)

OTHER PUBLICATIONS

Nikkei Sangyo Shinbun Article, p. 39 (box in upper right corner), with English translation, Mar. 4, 1996.*

(List continued on next page.)

Primary Examiner—Alan A. Mathews
(74) Attorney, Agent, or Firm—Sheppard, Mullin, Richter & Hampton LLP

(57) ABSTRACT

A device for producing printed images of a subject is described. The device includes a housing containing an imaging apparatus, and a frame carrying a hood configured to exclude outside light from illuminating a subject. The frame is rotationally spring loaded and counterbalanced on the housing, allowing the frame to be pulled downward without pulling the housing over onto the subject. The hood is configured to indirectly illuminate the subject by reflecting light onto the subject. The imaging apparatus includes a camera configured to take subject image data (i.e., a picture of the subject), a device to provide component-image data (i.e., background, foreground or framing images) to be synthesized with the picture of the subject, a device to synthesize the picture with the component-images, and a printer to print the resulting synthesized images.

A cassette unit that contains a plurality of read-only memory chips is removably plugged into the device. The read-only memory contains a large number of component-images for the subject to choose from. The subject selects four different component-images from the read-only memory for synthesizing with the subject's picture.

In order to take the picture of the subject, the camera-eye view of the subject is shown on a screen. The subject is forewarned of the time that the camera will take the picture by both a textual message on the screen and an audio message. Once the picture is taken, it is stored in a first digital memory. A circuit synthesizes each of the four component-images with the subject's picture, producing four synthesized images that are stored in a second digital memory. Optionally, the circuit can process the four synthesized images to create monochrome pictures. The imaging apparatus then prints a composite image composed of four rows of each of the four synthesized images.

33 Claims, 10 Drawing Sheets

U.S. PATENT DOCUMENTS

| | | |
|---|---|---|
| 5,343,386 | 8/1994 | Barber . |
| 5,500,700 | 3/1996 | Massarsky . |
| 5,577,179 * | 11/1996 | Blank ................................. 345/435 |
| 5,589,902 * | 12/1996 | Gruel et al. ............................ 396/3 |
| 5,617,138 * | 4/1997 | Ito et al. ............................. 348/222 |
| 5,621,492 | 4/1997 | Beveridge et al. . |
| 5,623,581 | 4/1997 | Attenberg . |
| 5,696,995 * | 12/1997 | Huang et al. ........................... 396/2 |
| 5,930,528 * | 7/1999 | Ito et al. ............................... 396/2 |
| 6,049,674 * | 4/2000 | Yamamoto et al. ..................... 396/2 |

FOREIGN PATENT DOCUMENTS

| | | |
|---|---|---|
| 58-50571 | 3/1983 | (JP) . |
| 61-137487 | 6/1986 | (JP) ............................... H04N/9/79 |
| 61-150031 | 7/1986 | (JP) ................................. G06F/3/16 |
| 61-165880 | 7/1986 | (JP) .............................. G11C/11/14 |
| 4-104572 | 4/1992 | (JP) . |
| 4-506264 | 10/1992 | (JP) . |
| 6-15382 | 2/1994 | (JP) . |
| 6-189308 | 7/1994 | (JP) . |
| 6-73967 | 10/1994 | (JP) . |
| 7-87430 | 3/1995 | (JP) . |
| 3014733 | 6/1995 | (JP) . |
| 7-41545 | 7/1995 | (JP) . |
| WO 90/10251 | 9/1970 | (WO) . |

OTHER PUBLICATIONS

Nikkan Gendai, "Business Town Hot–line," A edition or B edition, Nikkan Gendai Co., Ltd. right–upper side picture, May 2, 1996, p. 11.

"Gekkan Coin Journal," by Coin Journal Co., Ltd, "Maintenance Lecture for Learning for the Basic," right–upper side picture, May 30, 1996, vol. Jun., p. 204.

* cited by examiner

|       |       |
|-------|-------|
| m-SA  | m-SB  |
| m-SC  | m-SD  |

FIG. 12a

| SA | SB | SC | SD |
|----|----|----|----|
| SA | SB | SC | SD |
| SA | SB | SC | SD |
| SA | SB | SC | SD |

FIG. 12b

| m-SA | m-SB | m-SC | m-SD |
|------|------|------|------|
| m-SA | m-SB | m-SC | m-SD |
| m-SA | m-SB | m-SC | m-SD |
| m-SA | m-SB | m-SC | m-SD |

FIG. 12c

| s-SA | s-SB | s-SC | s-SD |
|------|------|------|------|
| s-SA | s-SB | s-SC | s-SD |
| s-SA | s-SB | s-SC | s-SD |
| s-SA | s-SB | s-SC | s-SD |

SHOOTING APPARATUS

BACKGROUND OF THE INVENTION

The present invention relates to an imaging device with an illuminator for illuminating a subject, and more specifically, to an imaging device comprising a hood for reflecting a light from the illuminator as well as preventing entrance of light from the outside. The present invention further relates to an imaging device including an image synthesis device for synthesizing a subject with synthesization component-images that have been previously prepared, such as background images, foreground images, and frame images, and for outputting the result using a video printer or the like.

Generally, an outdoor-type imaging device, such as for taking certification pictures, is known to exclude influences such as incident light by conducting the imaging after a person has entered into an enclosed booth. Imaging devices used as indoor game machines, such as in an arcade, are often configured to image a person while standing next to the machine. To prevent unnecessary background light from entering into the image, or from altering the illuminating effects, the imaging device is provided with a hanging screen that surrounds the upper body of the person to form a booth.

Figure 1A:
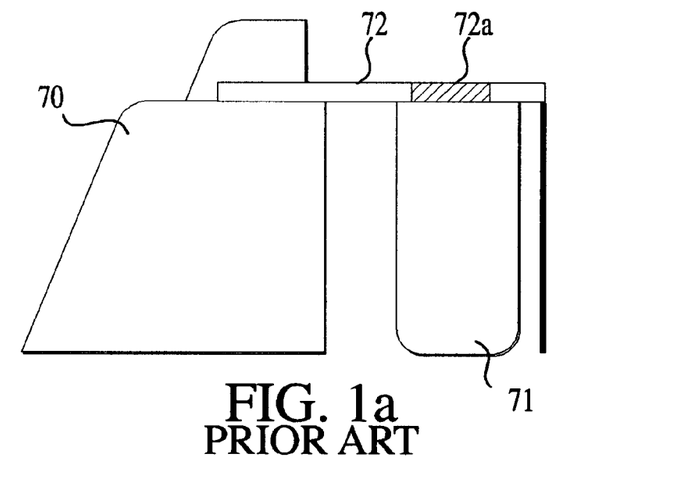

The housing of such an imaging device is generally configured in an elongated shape that is taller than a person. The provision of the above-described hanging screen, or of any type of hood over the person, can reduce the stability of such a housing, allowing for the housing to be pulled over. To handle this problem, it is known to use a U-shaped frame having opposite ends that attach to the top of the housing 70, where the frame includes stress-relaxing portions 72a in the form of coil springs, as shown in FIG. 1(a). In this configuration, when the hanging screen 71 is grasped and pulled down, the pulling force is converted into a force acting in an oblique direction with respect to the housing 70 by the bending of the stress-relaxing portions 72a, and the frame is thereby prevented from being pulled over.

An imaging device, including an image synthesizing device, used as a game machine, may contain data in the form of a multitude of synthesization component-images, such as background images, foreground images, and frame images. When a desired component-image is selected, and when a person poses and is imaged, a synthesized image may be formed in which the selected component-image and the image of the subject are synthesized by means of a CCD camera disposed behind a half mirror. This synthesized image is then processed by a built-in video printer unit, and a plurality of synthesized images can be printed out on a sheet.

In the above-described imaging device, when the multitude of component-image data is to be changed, the change is implemented by replacing read only memory (ROM) chips. To change a ROM chip that is mounted into a socket of a substrate, a high degree of caution is necessary so as to prevent static electricity, the entry of foreign substances, or the like, from damaging the chip and substrate. Therefore, it is difficult to maintain the integrity of the machine while changing the component-image data.

Furthermore, the plurality of synthesized images that are printed out onto a sheet include only a single component-image (e.g., a background image) and a single pose of the subject. The known device does not provide for printing a plurality of varied synthesized images.

In addition, during imaging, while a subject is posing in accordance with a chosen component-image, the subject is also required to conduct an operation, such as pushing a button on the operation panel, in order to start the imaging, thereby potentially causing blurs in the resulting image.

Accordingly, the conventional imaging device does not effectively prevent the housing from being pulled over, while allowing for enhanced illumination. Additionally, the conventional imaging device is subject to difficulties in changing component-image data. Furthermore, a wide variety of synthesized images can not be provided. Also, the images are subject to blurring because the start of the imaging operation may have to be manually conducted by the user.

SUMMARY OF THE INVENTION

Aspects of the present invention provide for an imaging device that is capable of obtaining sufficient illumination using a hood covering the upper part of the body, while effectively preventing the housing from being pulled over. Aspects of the present invention further provide for an imaging device, including an image synthesization device, which can easily allow for a change of component-images, such as background images. Furthermore, aspects of the present invention provide for an imaging device, including an image synthesization device, that is capable of producing a wide variety of synthesized images. Additional aspects of the present invention provide for an imaging device capable of conducting the imaging process without causing blurs in the resulting image due to manipulation.

Figure 1B:
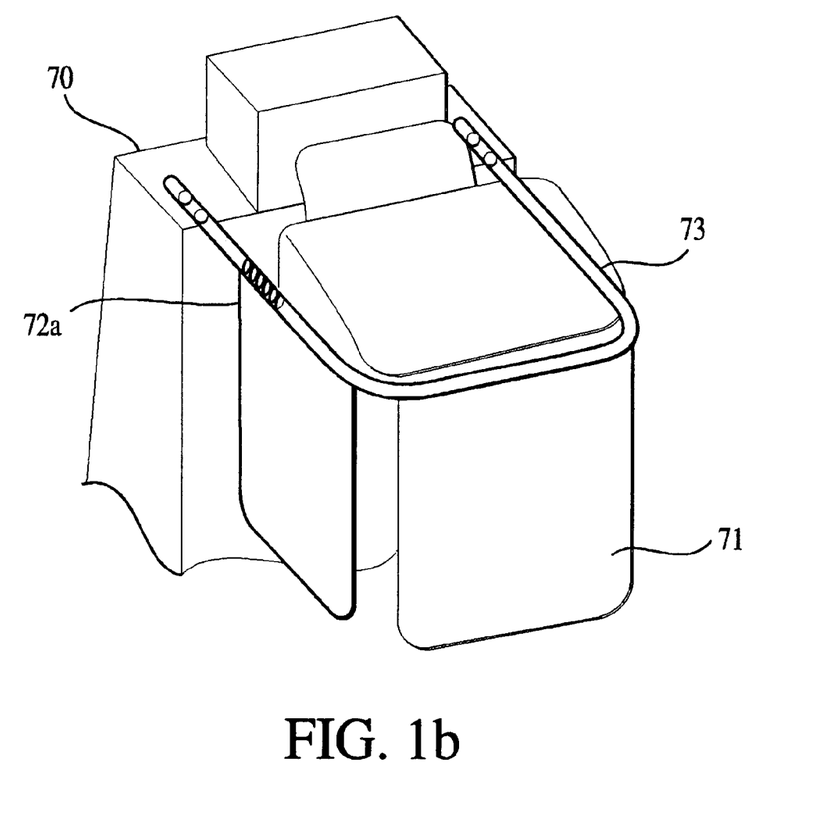

The provision of only a hanging screen leads to difficulties in enhancing the illumination, and in restricting the entrance outside light. If, for an imaging device such as that shown in FIG. 1(a), an upper cover member 73 (i.e., a hood) is attached to the frame 72, as shown in FIG. 1(b), the torque applied to the frame increases, thereby causing the stress relaxation portions 72a to be ineffective in preventing the housing 70 from being pulled over.

According to a first aspect of the present invention, an imaging device comprises a housing containing an imaging means, a frame whose end portions are rotatably attached to an upper end of a front of the housing, a hood that is disposed above the frame and is connected to the frame, and a compressive/extendable support means (i.e., a spring) having one end fixed to the hood and the other end attached to the top of the housing, for supporting the frame and the hood so that they are approximately parallel with each other. Preferably, this first embodiment is provided an illuminating means for illuminating at least one of the side portions and the upper portion of the housing. The support means is a preferably a spring member supporting the frame and the hood so that they are approximately parallel to a portion of the housing, by urging the hood to be adjacent to the top of the housing.

According to a second aspect of the present invention, the imaging device has an image-synthesis device that includes an imaging means for imaging a subject, a connecting means for detachably connecting an external storage unit storing data for a plurality of component-images that are different from each other, an image synthesizing means for synthesizing subject images imaged by the imaging means with component-images, and a supplying means for supplying the image synthesizing means with data for different component-images stored in the external storage unit while connected to the connecting means.

According to an adaptation of the second aspect of the present invention, the image synthesizing means includes a first frame memory circuit for storing the subject image data of the imaged subject, an image selecting means for successively selecting a plurality of different component-images from the external storage unit, an image synthesizer for synthesizing the subject image data that is output from the first memory with successive component-image data selected with the image selecting means to successively output synthesized image data, and a second frame memory circuit for storing the plurality of synthesized image data produced from the successive component-image data. The image synthesizing device prints the plurality of synthesized images onto one sheet, using the plurality of synthesized image data stored in the second memory.

According to another adaptation of the second aspect of the present invention, the image synthesizing device also includes an image converting means for converting colors of the synthesized image data output from the image synthesizer into monochrome.

According to yet another adaptation of the second aspect of the present invention, the image synthesizing device also includes an instruction means through which a user gives instruction to start the imaging by the imaging means, a text display means for displaying text that communicates imaging device timing in response to an operation by the instruction means, and a voice guiding means for outputting audio information in synchronization with the text displayed by the text display means.

According to a third aspect of the present invention, an image synthesizing device includes an imaging means for imaging a subject, a connecting means for detachably connecting an external storage unit storing a plurality of different component-image data, a selecting means for successively selecting and outputting the different component-image data stored in the external storage unit connected to the connecting means, an image synthesizing means for successively synthesizing the image data of the subject (taken by the imaging means) with each of the different component-image data selected by the selecting means, and a printing means for printing a plurality of different synthesized images on one sheet, based on the different synthesized image data obtained by means of the image synthesizing means.

BRIEF DESCRIPTION OF THE DRAWINGS

FIG. 1(*a*) is a partial elevational view illustrating a prior art imaging device.

FIG. 1(*b*) is a partial perspective view illustrating a prior art imaging device as it would be if provided with a hood.

FIG. 10(*a*) is a diagram of the state of four synthesized image data in a second frame memory circuit, according to the fourth embodiment of the present invention.

FIG. 10(*b*) is a diagram of the layout printed on a video printer according to the fourth embodiment of the present invention.

FIGS. 12(*a*) is a diagram illustrating the state of four synthesized image data in a second frame memory circuit, according to the fifth embodiment of the present invention.

FIGS. 12(*b*) is a diagram illustrating a color layout printed on a video printer according to the fifth embodiment of the present invention.

FIGS. 12(*c*) is a diagram illustrating a monochrome layout printed on a video printer according to the fifth embodiment of the present invention.

FIGS. 12(*d*) is a diagram illustrating a sepia layout printed on a video printer according to the fifth embodiment of the present invention.

DETAILED DESCRIPTION OF THE PREFERRED EMBODIMENTS

EMBODIMENT 1

Figure 2:
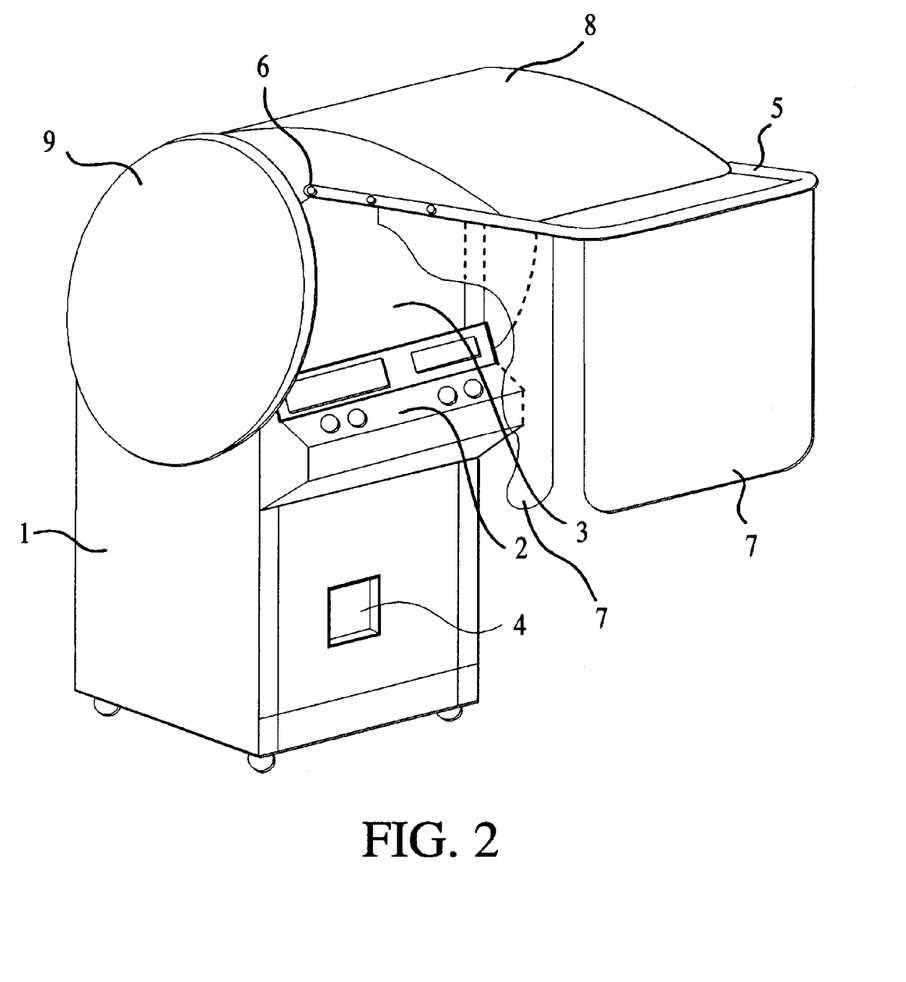
FIG. 2 is a perspective view illustrating an imaging device provided with a hood according to a first embodiment of the present invention.
Figure 3:
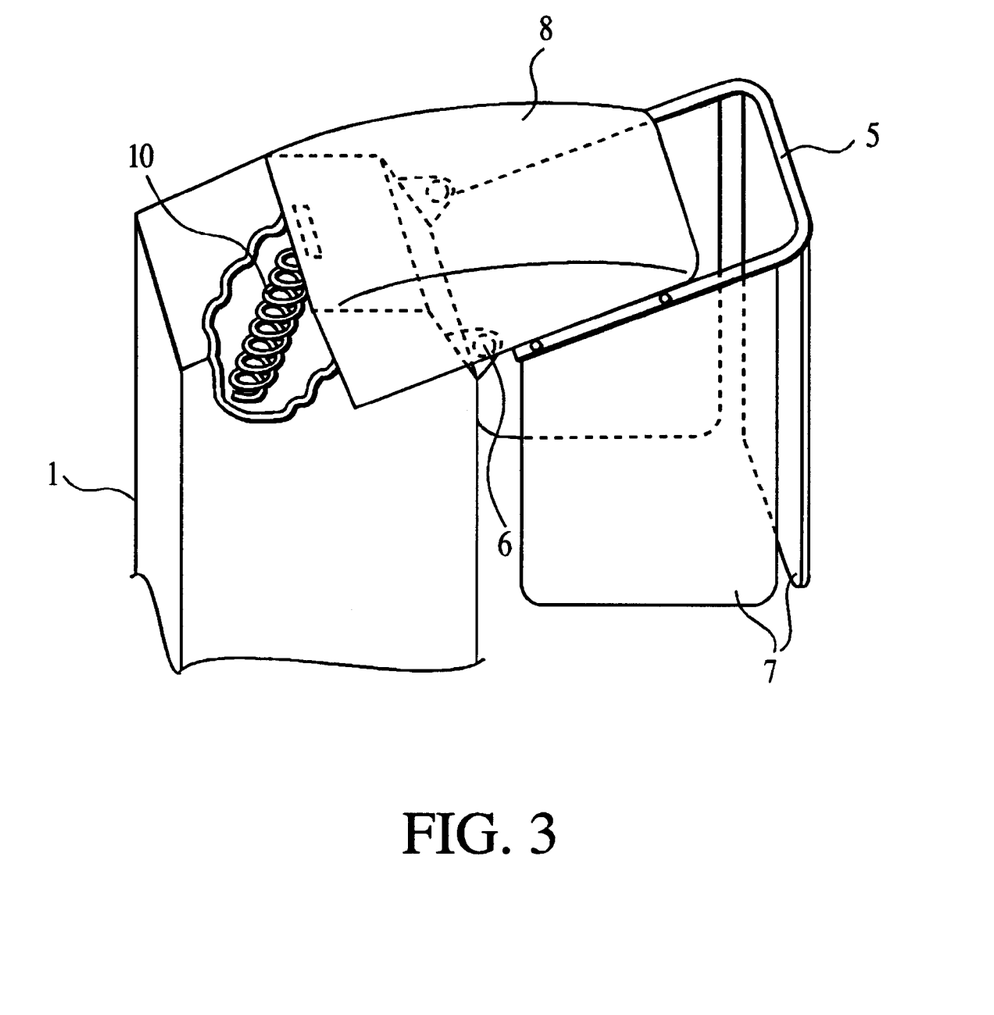
FIG. 3 is a cross-sectional perspective view illustrating the structure of the imaging device depicted in FIG. 2.
Figure 4:
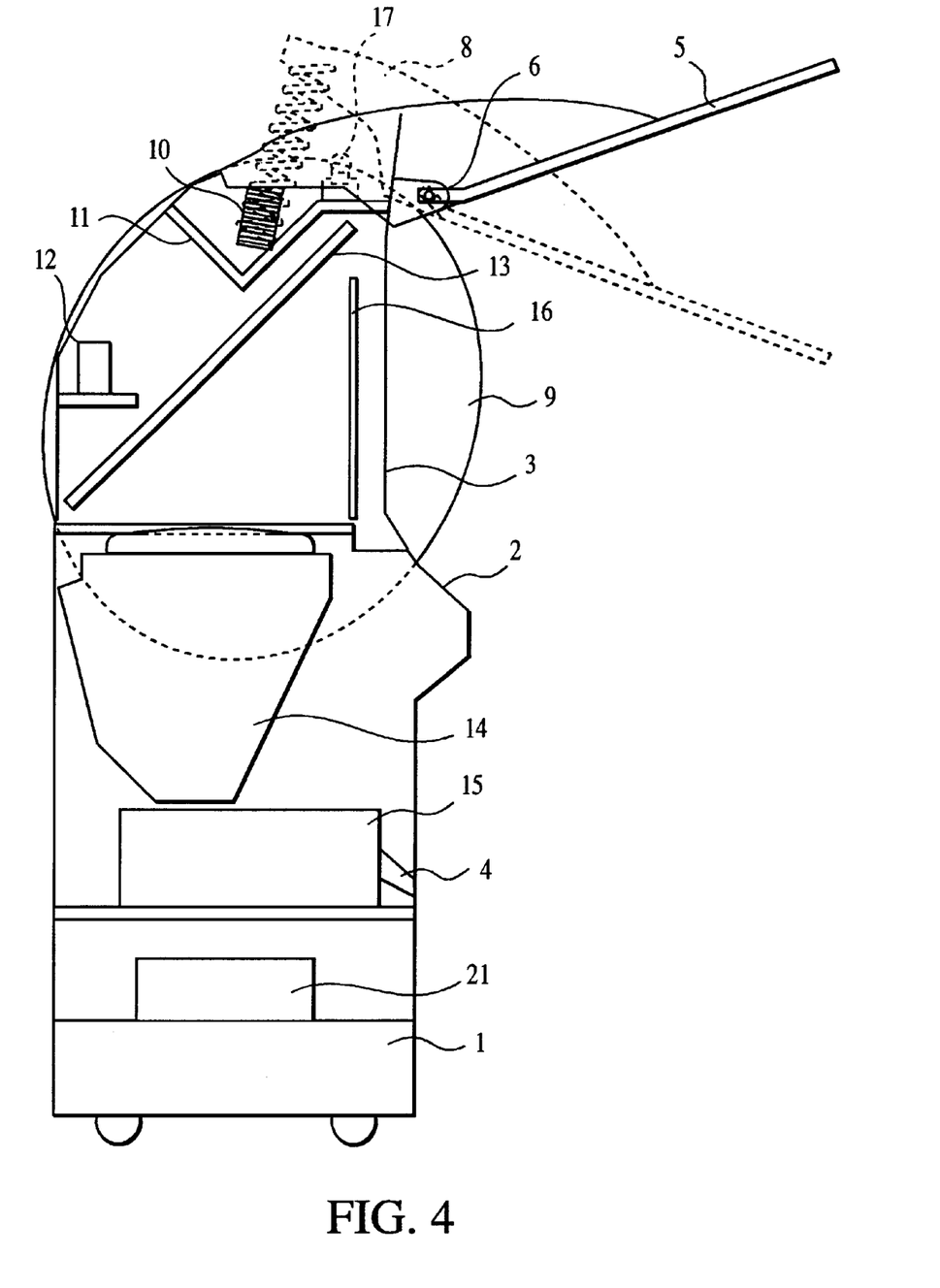
FIG. 4 is a side sectional view illustrating the imaging device according to the first embodiment of the invention, and illustrating an image synthesization device according to a third embodiment of the invention.

FIGS. 2–4 depict an imaging device, provided with a hood, according to a first embodiment of the present invention. A housing 1 is configured with the dimensions of 62 cm in width, 58 cm in length, and 185 cm in height. An operation panel 2 for operating imaging equipment contained in the housing 1 is provided at the center of a front face of the housing, an imaging window 3 for conducting imaging is provided at an upper portion thereof, and an outlet 4 for taking out a sheet, such as of paper, that an imaged video is printed on is provided below the operation panel 2. Above the front face of the housing 1, an approximately U-shaped frame 5, which is made of steel or the like and which has two ends that are rotatable with a support axis 6 as its center of rotation, is provided as a holding means for holding a hood 8 (i.e., a light reflecting means) and three hanging screens 7. The hanging screens are attached to the frame 5 such that the front face of the housing 1 is surrounded from three sides. The hood 8 is shaped to cover a region extending from the top of the housing 1 to a portion of the frame 5. A substrate unit 21 for performing image synthesization processing is contained in the lower part of the housing 1. An oval-shaped side cover 9 is attached to the side of the housing 1, and is used as a face plate.

As seen in FIG. 4, a coil spring 10 acts as a support means, having one end fixed to the hood 8 and the opposite end attached to a light shielding plate member 11 attached to the top of the housing 1. The spring urges the hood 8 toward the housing 1 so that the hood 8 becomes approximately parallel with the housing. A CCD camera 12 (for imaging) is disposed at the rear of the housing 1 such that it faces the imaging window 3, which is disposed at the front face of the housing 1. A half mirror 13 is disposed in a space between the imaging window 3 and the CCD camera 12. Constituting a monitoring means, a CRT 14 is disposed with its screen facing toward the top of housing 1 and the half mirror 13. A video printer unit 15 provides for printing an image and sending it out to the outlet 4. An illuminator 16, such as a fluorescent light, is disposed inside the imaging window 3. Light is provided by an illuminator 17, such as a fluorescent light, attached to the top of the light shielding plate member 11, such that the radiated light projects on the inner surface of the hood 8 and is reflected thereby. Preferably, the hood 8 is made of white acrylic to obtain high reflection efficiency for the illuminating light.

To operate the above-described imaging device, a person selects a desired background image from among a multitude of background images. The background image is projected from the CRT 14 and displayed on the half mirror 13. The person is imaged while standing in front of the imaging window 3 by operating the operation panel 2. Video subject image data of the person (imaged by the CCD camera 12 through the imaging window 3 and the half mirror 13) and the component-image data of the selected background image are subjected to image synthesization processing through the substrate unit 21. During this same time, the upper portion of the imaging window 3 is covered by the hood 8, and light radiated by the illuminator 17 is reflected by the inner surface of the hood 8 to illuminate the person positioned below, while influences such as outside light are excluded, thereby improving the illumination. The result is printed out on a sheet, such as paper, in the video printer unit 15 and sent out to the outlet 4.

Figure 5:
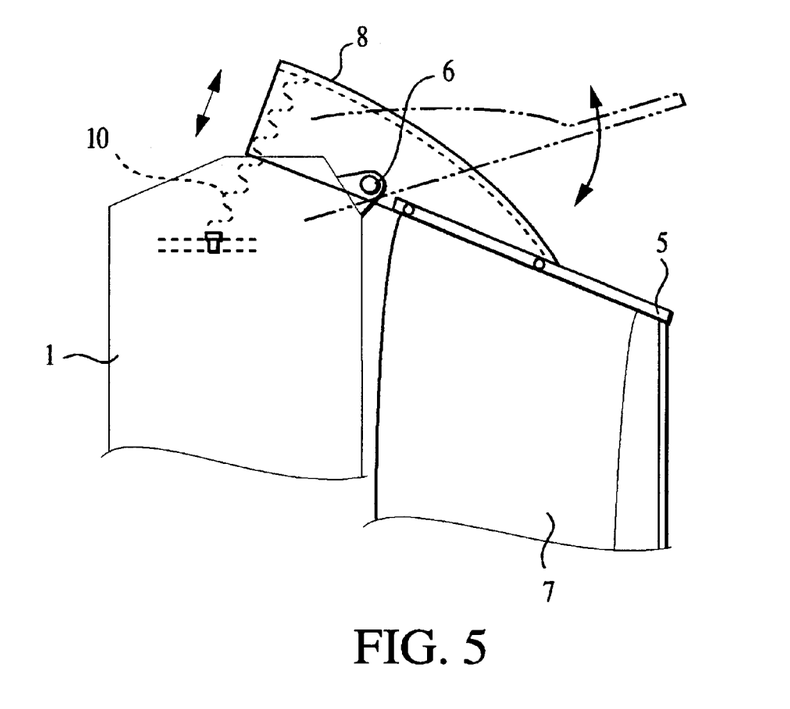
FIG. 5 is a partial side view illustrating operations of the imaging device according to the first embodiment of the invention.

If downward stresses are applied to the hood 8 or the hanging screens 7 (i.e., if they are pulled down), when the stress becomes larger than the force of the coil spring 10, the frame 5 rotates around the support axis 6, causing the hood 8 and the hanging screens 7 to be inclined together along with the frame 5, as shown in FIG. 5. Frame 5 then functions as a lever operating with the support axis 6 as fulcrum, acting on the top part of the housing through the coil spring. This is entirely different from a conventional structure, as shown in FIGS. 1(*a*) and 1(*b*), where the stress, having acted on the stress relaxing portions 72*a*, changes its direction to an oblique downward direction and acts on the top of the housing 70 at a portion where the frame 72 is attached. In the structure of the first embodiment, the rotation of the attached parts of the frame 5 with the support axis 6 as its center causes most of the applied stress to act as a force for extending the coil spring 10 (connected to the hood 8) upwardly and the stress applied to the housing 1 is relaxed by the extension of the coil spring 10 and thus not directly applied to the housing 1, thereby reducing the possibility of the housing being pulled over.

Thus, in first embodiment, both end portions of the approximately U-shaped frame 5 are attached to the upper end of the front face of the housing 1, and are rotatable around support axis 6. The hood 8 is arranged joined to the frame 5 at a position over the frame 5, one end of the coil spring 10 is attached to the rear end of the hood 8 and the other end thereof is attached to the top of the light shielding plate member 11 at an upper portion of the housing 1 so as to support the frame 5 and the hood 8 so that they become approximately parallel. Therefore, even when stress is applied to the frame 5, the frame 5 rotates at its attachment portion with the support axis 6 as its center, and most of the applied stresses becomes a force for extending the coil spring 10 attached to the hood 8 upwardly, the stress applied to the housing 1 is relaxed by the extension of the coil spring 10 and not directly applied to the housing 1, whereby the housing is not likely to be pulled over, thereby resulting in an improvement over the prior art.

Furthermore, since the space above the imaging window 3 is covered by the hood 8, the light radiated by the illuminator 17 toward the inside of the hood 8 is reflected by the inner surface of the hood 8 so as to illuminate a person positioned below. Outside light impinging on the top of the housing 1 is excluded, thereby providing for superior illumination.

While in the first embodiment, a coil spring 10 is provided, a plurality of coil springs may equally be employed. The spring constant of the coil spring may be set as required depending on parameters such as the length of the frame 5 and the weight of the hood 8. As preferred, the spring constant may be selected such that the extension begins when a weight of about 5 kilograms is applied to the front of the frame 5.

Furthermore, while illuminators 16 and 17 are provided at both the sides and top of the front face of the housing, respectively, illuminators may be provided only at either location.

EMBODIMENT 2

Figure 6:
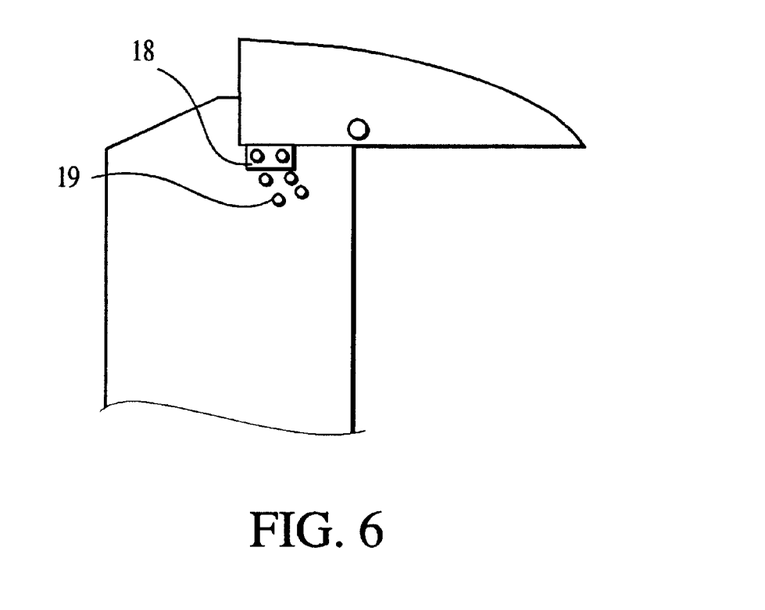
FIG. 6 is a partial side view illustrating an imaging device according to a second embodiment of the present invention.

With reference to FIG. 6, in a second embodiment of the invention, stoppers 18 on the hood attach to upper portions of both sides of the housing 1. A plurality of fitting holes 19 for receiving the stoppers 18 are provided on the sides of the housing 1. The position of the hood 8, when supported by the stoppers received in fitting holes, can be changed according to the holes 19 that are used. The stoppers 18 thus determine the hoods position while the hood is supported by the stoppers.

By changing the positions of the stoppers 18, the position of the hood 8 is made adjustable. Therefore, the inclination of the hood 8 can be changed to some extent depending on the conditions.

Figure 7:
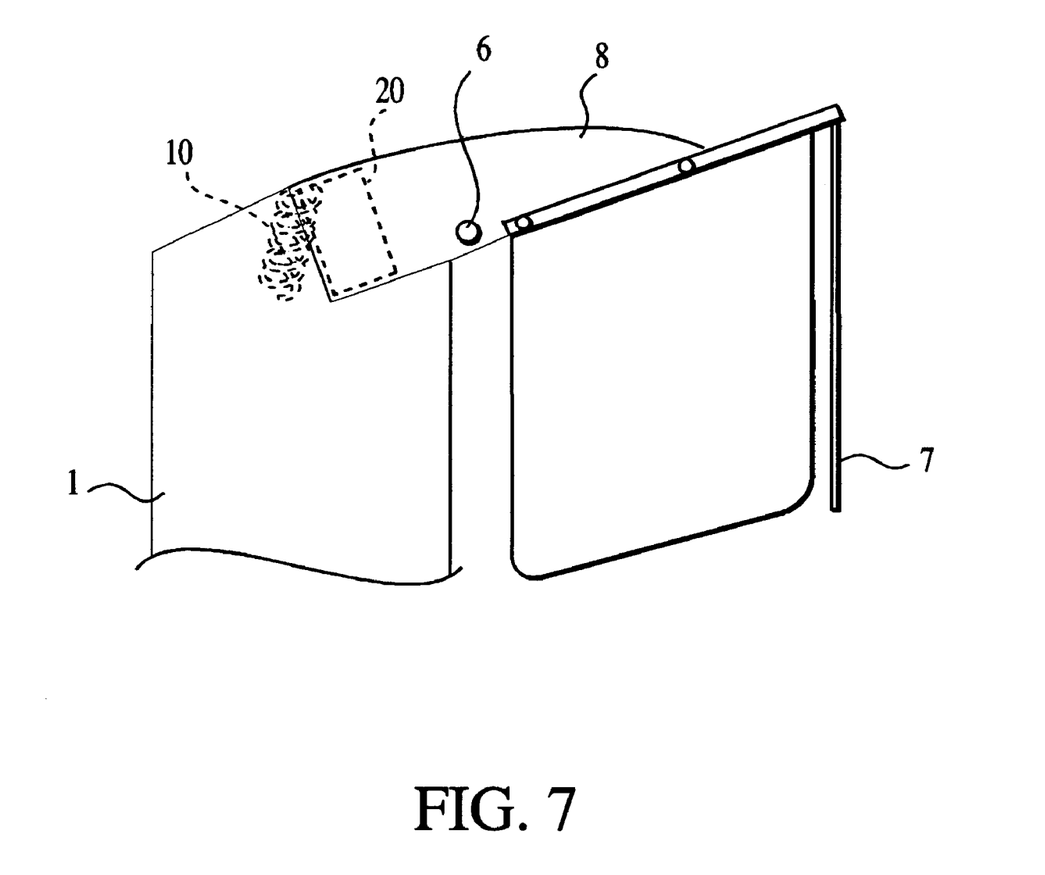
FIG. 7 is a partial sectional view illustrating the imaging device according to the first embodiment of the invention, further having a weight at a rear end of the hood.

While in the first embodiment, the spring constant(s) and the number of coil springs to be used are adjusted to balance the applied stress, a weight 20 may also be provided by adhering a sheet of a metal having a relatively heavy specific gravity, such as lead, along the inner surface of the rear end of the hood 8, as shown in FIG. 7. By adjusting the weight of this weight 20, a greater stress is required for the hood 8 to start rotation around the support axis 6. In other words, the same effect can be obtained as in a case where a stronger coil spring is employed in the first embodiment.

EMBODIMENT 3

Figure 8:
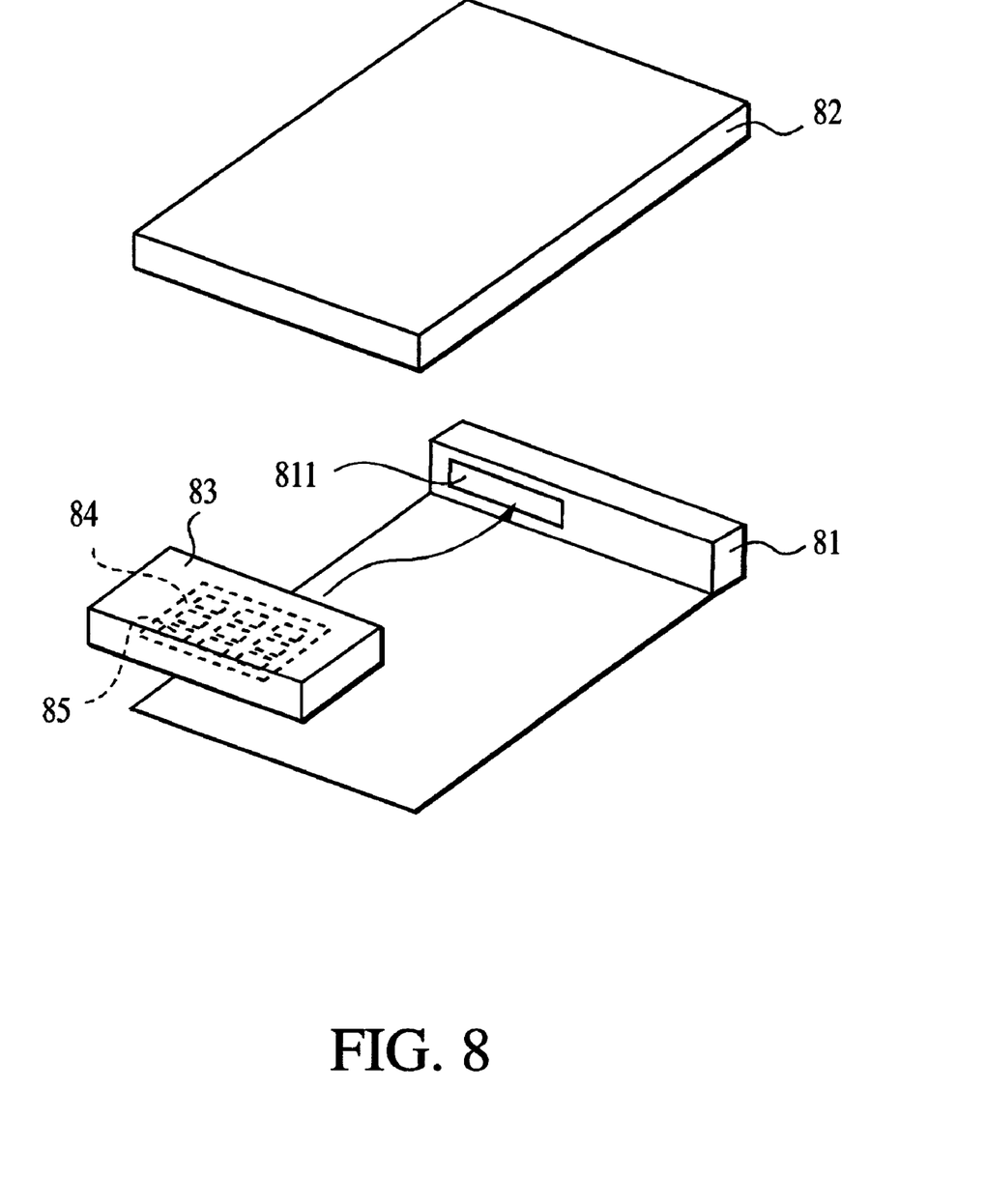
FIG. 8 is a perspective view illustrating a substrate unit of the image synthesizing device according to the third embodiment of the invention.

With reference to FIG. 8, in a substrate unit 21 contained in the housing 1 of a third embodiment of the invention, a body substrate 81 is configured with a cover 82. A cassette 83 serves as an external storage unit containing a read only memory (ROM) substrate 84. A plurality of ROM chips 85 are mounted on the ROM substrate 84. A connector 811 electrically connects the cassette 83 and the body substrate 81, and the cassette 83 is thereby mounted onto the body substrate 81 detachably by the connector 811. The ROM chips carry synthesization component-images, such as background images.

To change the synthesization component-images available for imaging, a cassette 83, having a ROM substrate 85, and carrying images that are different from that of the cassette currently mounted, is prepared. The cover 82 of the substrate unit 21 is removed to expose the currently mounted cassette 83, and this currently mounted cassette 83 is removed from the body substrate 81. Then, the prepared cassette 83 is mounted to the connector 811 and the cover 82 is closed. The ROM chips storing the background images can thus be easily changed by using the cassettes 83.

Further, the number of background images can be increased by increasing the number of ROM chips 84 mounted on the ROM substrate 85. Thus, the above-described structure enables easily increasing the kinds of background images by simply changing the cassette 83.

According to the third embodiment, ROM chips that store component-images, contained in the easily changeable cassette 83, are less likely to be subjected to static electricity or other damaging influences as compared with the conventional technology of mounting ROM chips into sockets on a substrate. Thus, background images can be replaced with ease, handling becomes easier, and the maintenance of the device is simplified.

EMBODIMENT 4

Figure 9:
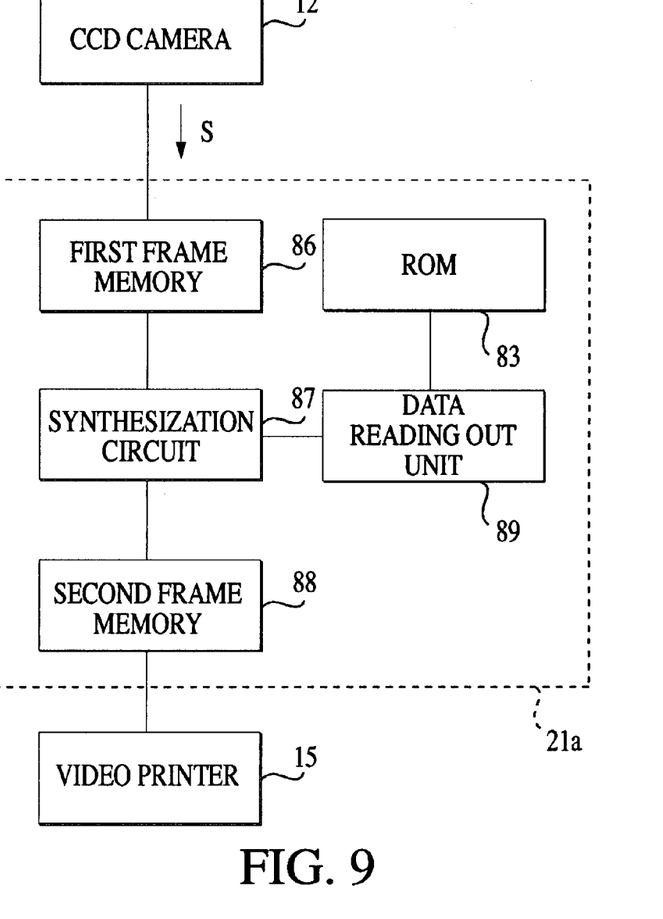
FIG. 9 is a block diagram illustrating an image synthesizing device according to a fourth embodiment of the present invention.

With reference to the block diagram of FIG. 9, according to a fourth embodiment of the invention a substrate unit 21*a* receives the data for the subject image S that is imaged by the CCD camera 12. A first frame memory circuit 86 is configured to store the subject image S sent from the CCD camera 12. A synthesization circuit 87 is configured as an image synthesizer for synthesizing the image data from the first memory 86 with image data (i.e., component-image data) sent from a cassette 83. The background image data is sent from the cassette 83 to the synthesization circuit 87 by an image selector 89 for selecting and transferring one of the background images that are stored in the cassette 83. A second frame memory circuit 88 is configured for taking in the synthesized image data output from the synthesization circuit 87, while reducing the size of the synthesized image into one quarter thereof.

In operation, the subject image S of a subject (in most cases, a person) is initially imaged by the CCD camera 12, and is then transferred into the first memory 86. Then, the subject image is output from the first memory to the synthesization circuit 87, where it is synthesized with a background image A that is stored in the cassette 83. The background image A is one of several backgrounds previously selected by the subject, and it is read from the cassette 83 by the image selector 89. The synthesized image SA, obtained by the synthesization, is stored in a predetermined address in the second memory 88, with its size reduced to one quarter thereof.

Figure 10A:
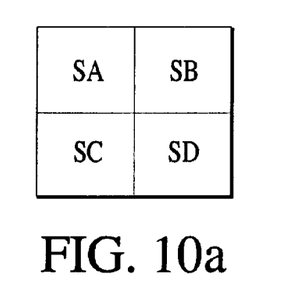
Figure 10B:
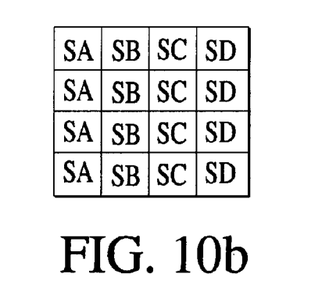

Subsequently, the image selector 89 reads out the next selected background image B, and outputs it to the synthesization circuit 87, where it is synthesized with the subject image S, which is again obtained from the first memory 86. The resulting synthesized image is sent to the second memory 88, with its size being reduced, and it is stored therein. Similarly, image S is synthesized with background images C and D, and stored in the second memory, thus forming four synthesized images SA–SD, which are stored in the second memory 88 in a state as shown in FIG. 10(*a*). The four images, SA–SD in the second memory 88 are then printed out by the video printer 15 so as to obtain a layout as shown in FIG. 10(*b*).

As described above, according to the fourth embodiment, the image S of a subject, imaged by the CCD camera 12, and the plurality of background images A–D, read out from the cassette 83, are processed by means of the first and second memories 86, 88 and the synthesization circuit 87, whereby a wide variety of synthesized images can be provided.

While the fourth embodiment provides for a printed result having a layout of four rows and four columns arranged on a sheet, any numbers of background images and printing sheets may be employed. It is also possible to obtain a printed sheet on which a plurality of synthesized images all have different respective background images. Furthermore, the readout order of the background images A, B, C, and D may be changed.

EMBODIMENT 5

Figure 11:
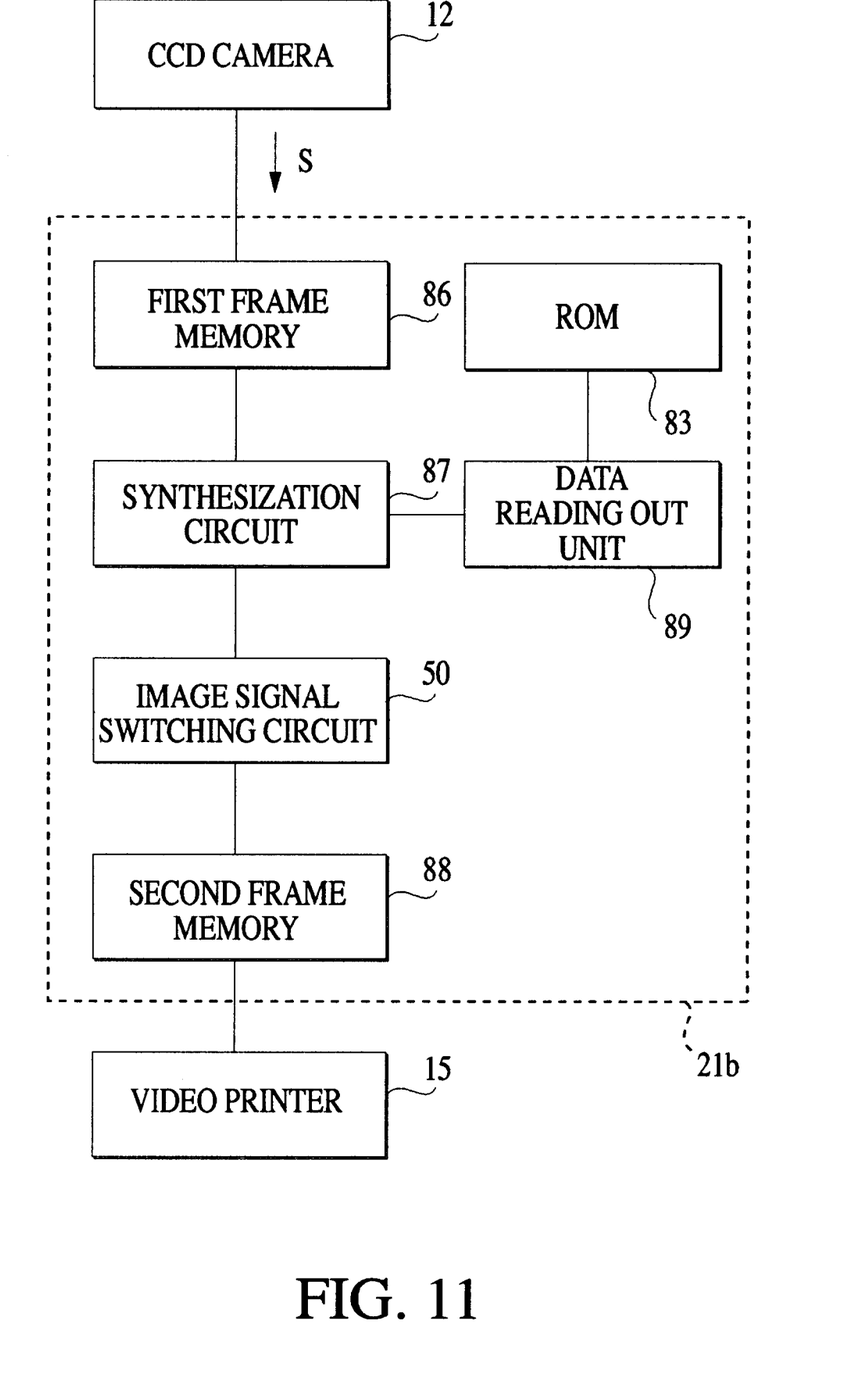
FIG. 11 is a block diagram illustrating an image synthesizing device according to a fifth embodiment of the present invention.

With reference to FIG. 11, according to a fifth embodiment of the present invention, a substrate unit 21*b* receives the image S, imaged by the CCD camera 12. The fifth embodiment differs from the substrate unit 21*a* of the fourth embodiment in that an image signal switching circuit 50 is provided at a stage between the synthesization circuit 87 and the video printer 15. This image signal switching circuit functions as an image converter, converting a data for a synthesized image that is output from the synthesization circuit (which is normally a color image) to monochromatic data by, for example, only outputting brightness signals. Thus, the embodiment is designed to be switched between the color mode and a monochromatic mode.

When operating in the monochromatic mode, the synthesized image output from the video printer 15 is monochromatic. However, when designated in the color mode, the synthesized image from the synthesization circuit 87 simply passes through the image signal switching circuit 50 at a following stage to be stored into the second memory 88.

Figure 12A:
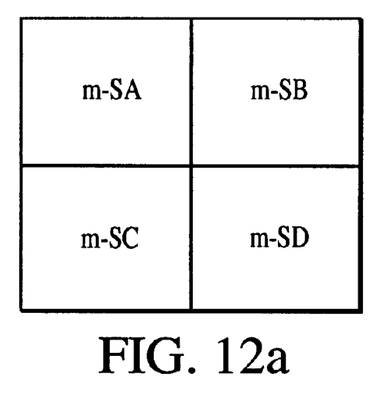
Figure 12B:
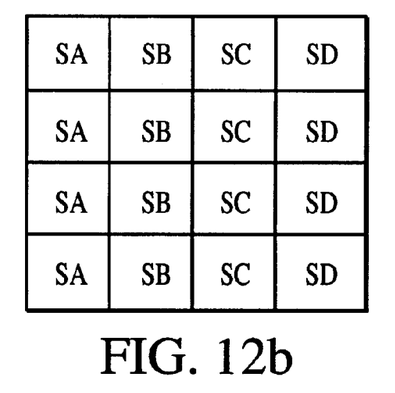
Figure 12C:
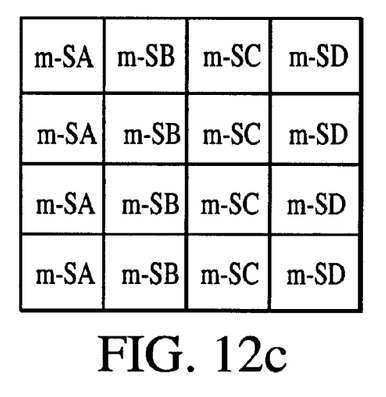
Figure 12D:
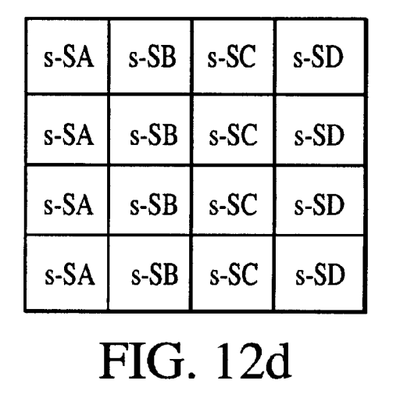

In monochromatic mode, similar to the fourth embodiment, an image S of a subject imaged by the CCD camera 12 is taken into the first memory 86, and output to the synthesization circuit 87. Therein, it is synthesized with the background image A which is stored in the cassette 83. The synthesized image SA is converted from color data to monochromatic data in the image signal switching circuit 50, and stored in a prescribed address in the second memory 88, with its size reduced to one fourth thereof. Next, background images B, C, and D, are likewise processed, forming four kinds of monochromatic synthesized images m-SA–m-SD, which are stored in the second memory 88 as shown in FIG. 12(*a*).

Printing is carried out so as to obtain a layout as shown in FIG. 12(*c*), using the four kinds of monochromatic synthesized images m-SA–m-SD stored in the second memory 88. In a case where printing out in sepia is preferred, it is accomplished by applying image processing to the synthesized image data in monochromatic mode stored in the second memory 88. By conducting the above-described processing, it is possible to print out sheets which have layouts in color, monochromatic, and sepia as shown in FIGS. 12(*b*), 12(*c*), and 12(*d*), respectively.

As described above, according to the fifth embodiment, the image S of a subject, imaged by the CCD camera 12, and the plurality of background images A–D, read out from the cassette 83, are processed by means of the first and second memories 86, 88 and the synthesization circuit 87, and simultaneously, the resulting synthesized image is converted into monochromatic data by the image signal switching circuit 50, whereby a wider variety of synthesized images can be provided.

EMBODIMENT 6

Figure 13:
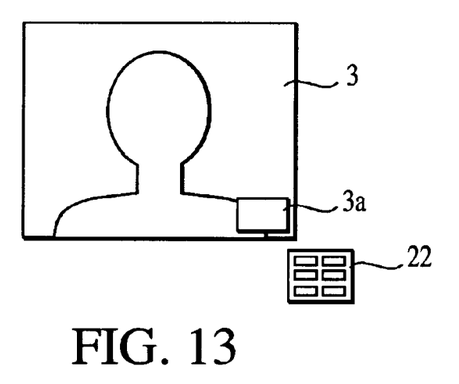
FIG. 13 is a diagram illustrating an imaging device with an imaging window according to a sixth embodiment of the present invention.

With reference to FIG. 13, according to a sixth embodiment of the invention, a text display window 3*a* is provided in a lower right corner of the imaging window 3. Text is displayed in the display window 3*a*, but is not displayed on the resulting images when printed. A speaker 22 is configured for outputting voices that not only explain the procedure of the imaging, but also guide the subject with regard to the timing of the imaging in synchronization with text in the text display window.

While it is known to select a background image or conduct an imaging starting procedure while guided by a voice, the known procedure has a shutter that operates after a predetermined time, or requires an operation such as pushing a button on an operation panel for imaging. Thus, a user's eyes may be averted from the screen or the user may move, causing a blur. In the sixth embodiment, after pushing an imaging-start button (not shown) as an instruction means provided on the operation panel 2, the timing of the imaging is guided by text and voice while the preparation for imaging is completed, and subsequently, a countdown for the imaging is conducted by text and voice.

As described above for the sixth embodiment, even after it is set to the imaging mode, guidance is provided in the text display window 3a and by the speaker 22, and subjects can keep their eyes on the imaging window 3, and thus imaging can occur under conditions similar to those found when working with a cameraman. Blurred images are less likely to occur, and a synthesized image of a desired composition can be obtained with ease.

While in the above-described embodiments, background images are used as component-images, foreground images or frame images may likewise be used as component-images within the scope of the invention.

Thus, a preferred imaging device, according to the present invention, comprises a housing containing an imaging means, a frame whose end portions are rotatably attached to an upper end of a front face of the housing, a hood disposed at above the frame with connected to the frame, a compressive/extendable support means having one end fixed to the hood and the other end attached to the top of the housing for supporting the frame and the hood so that they are approximately parallel with each other. Since most of the stress applied to the frame serves as a force for extending a support means attached to the hood upwardly, the stress applied to the housing is relaxed by the extension of the support means and not directly applied to the housing, whereby the housing is not likely to be pulled over. This results in improved stability over the prior art.

Further, the preferred imaging device is provided with an illuminating means for radiating light from at least one of the side portions and the upper portion of the housing, and is configured such that the light impinges on the inside of the hood to reflect and illuminate the person positioned below, while external light from above the housing is excluded, improving the illumination.

The imaging device, provided with a hood, includes a spring member used as the support means, whereby the device can be manufactured at low cost. Furthermore, the imaging device includes an image synthesizing device which comprises an imaging means for imaging a subject, a connecting means for detachably connecting an external storage unit storing data for a multitude of different component-images, a supplying means for supplying to the image synthesizing means the different component-images stored in the external storage unit, and the image synthesizing means for synthesizing the subject image data imaged by the imaging means with the component-image data supplied through the supplying means, whereby component-images, such as background images, can be replaced with ease and the imaging device's maintenance can be simplified.

Furthermore, the image synthesizing means comprises a first memory for storing the subject image data, an image selecting means for successively selecting a plurality of component-image data from the data stored in the external storage unit, an image synthesizer for synthesizing the image data of the subject from the first memory with the component-image data selected by the image selecting means, to successively output synthesized image data, and a second memory for storing synthesized image data each for respective component-image, whereby a wide variety of synthesized images can be provided. The imaging device may include an image data converting means for converting a color synthesized image output from the image synthesizer to monochromatic, whereby a wider variety of synthesized images can be provided.

Additionally, the image synthesizing device may include an instruction means through which a user gives an instruction to start imaging, and then a text display means communicates shutter timing in response to an operation by the instruction means, and a voice guiding means outputs a voice in synchronization with the text displayed by the text display means, allowing imaging to be carried out without blurring.

What is claimed is:

1. An imaging device for forming a synthesized image of a subject, comprising:
    a camera for imaging the subject to form subject image data for a subject image;
    a storage unit that stores component-image data for a plurality of different component-images;
    an image synthesizer configured to synthesize subject image data with component-image data to form synthesized image data for a synthesized image;
    an input device configured for the subject to give an instruction to start the timing of the camera's imaging;
    a textual display configured to communicate the timing of the camera's imaging; and
    a speaker circuit configured to signal the moment of the camera's imaging in synchronization with the textual display.

2. The imaging device of claim 1, and further comprising an image selector configured to read selected component-image data from the storage unit and supply the selected component-image data to the image synthesizer.

3. The imaging device of claim 1, and further comprising:
    a first memory configured to store the subject image data from the camera, and configured to supply the subject image data to the image synthesizer;
    an image selector configured to read selected component-image data for a plurality of different component-images from the external storage unit, and configured to successively supply the selected component-image data to the image synthesizer to form synthesized image data for a plurality of different synthesized images; and
    a second memory configured to store synthesized image data for the plurality of different synthesized images;
    wherein the image synthesizer is configured to successively synthesize the subject image data stored in the first memory with the successively supplied, selected component-image data for each of the plurality of component-images to respectively form the synthesized image data for the plurality of different synthesized images; and
    wherein the second memory separately stores the synthesized image data for the plurality of different synthesized images.

4. The imaging device of claim 3, and further comprising an image printer configured to print an image including a plurality of each of the plurality of different synthesized images having synthesized image data stored in the second memory.

5. A method for producing a single viewable image including a plurality of different synthesized images of a subject, comprising:

imaging the subject to form subject image data for a subject image;

selecting at least two different component-images from a plurality of different component-images;

synthesizing the subject image data for the subject image with component-image data for each of the at least two different component-images to respectively form synthesized image data for at least two different synthesized images; and     producing a single viewable image that separately includes at least one of each of the at least two different synthesized images.

6. The method of claim 5, wherein the step of producing includes storing the synthesized image data for the at least two different synthesized images in a memory.

7. The method of claim 5, wherein the step of producing includes printing the viewable image.

8. The method of claim 5, wherein, in the step of producing, the viewable image includes a plurality of each of the at least two different synthesized images.

9. The method of claim 5, wherein, in the step of producing, the viewable image includes four of each of the at least two different synthesized images.

10. The method of claim 5, wherein the step of producing includes storing synthesized image data for each of the at least two different synthesized images in a memory, and the viewable image includes four of each of the at least two different synthesized images.

11. An imaging device for forming a synthesized image of a subject, comprising:

a camera for imaging the subject to form subject image data for a subject image;

an external storage unit including a printed circuit board carrying semiconductor memory that stores component-image data for a plurality of different component-images;

a connector configured to receive the external storage unit in an easily detachable fashion;

an image selector configured to read component-image data for a selected component-image from the external storage unit; and     an image synthesizer configured to receive the component-image data for the selected component-image from the image selector, and to synthesize the subject image data for the subject image with the component-image data for the selected component-image to form synthesized image data for a synthesized image;

wherein the external storage unit is separate from the image selector and the image synthesizer.

12. A method of increasing the number of component-images available for synthesizing with a subject image in the imaging device of claim 11, comprising:

detaching the external storage unit from the connector; and     attaching a second external storage unit to the connector, the second storage unit including semiconductor memory that stores component-image data for a greater number of component-images than the number of component-images in the first external storage unit's plurality of different component-images;

wherein the image selector is configured to read component-image data for selected component-images from external storage units having component image data for differing numbers of component-images.

13. The imaging device of claim 11, wherein the external storage unit is in the form of a cassette-type unit that contains the printed circuit board carrying the semiconductor memory, the cassette-type unit being configured to be removably plugged into the remainder of the imaging device.

14. The imaging device of claim 11, and further comprising:

a first memory configured to store the subject image data for the subject image from the camera, and configured to supply the stored subject image data to the image synthesizer;

wherein the image selector is configured to read component-image data for at least two selected component-images from the external storage unit; and     wherein the first memory and the image synthesizer are configured to successively synthesize the stored subject image data for the subject image with the component-image data for each of the at least two selected component-images to respectively form synthesized image data for at least two different synthesized images.

15. The imaging device of claim 14, and further comprising a second memory configured to simultaneously store the synthesized image data for the at least two different synthesized images.

16. The imaging device of claim 15, and further comprising an image printer, wherein the imaging device is configured such that the image printer prints an image including a plurality of each of the at least two different synthesized images having synthesized image data stored in the second memory.

17. The imaging device of claim 15, wherein the external storage unit is in the form of a cassette-type unit that contains the printed circuit board carrying the semiconductor memory, the cassette-type unit being configured to be removably plugged into the the remainder of the imaging device.

18. The imaging device of claim 11, and further comprising an image converter configured to operate on the synthesized image data to convert the synthesized image to a monochromatic image.

19. The imaging device of claim 11, and further comprising:

an input device configured for the subject to give an instruction to start the timing of the camera's imaging;

a textual display configured to communicate the timing of the camera's imaging; and     a speaker circuit configured to communicate the timing of the camera's imaging in synchronization with the textual display.

20. The imaging device of claim 19, and further comprising an image data converter configured to operate on the synthesized image data to convert the synthesized image to a monochromatic image.

21. An imaging device for forming a synthesized image of a subject, comprising:

a camera for imaging the subject to form color subject image data for a subject image;

a storage unit that stores component-image data for a plurality of different component-images;

an image synthesizer configured to synthesize the color subject image data for the subject image with component-image data for a selected component-image from the storage unit to form color synthesized image data for a synthesized image;

a selection input device configured for the subject to input a selection of whether the color synthesized image data is to be converted to monochromatic synthesized image data;

an image data converting circuit configured to process the synthesized image data to selectively convert the synthesized image data from the image synthesizer to monochromatic synthesized image data based on the selection input on the selection input device;

a synthesized-image memory configured to receive synthesized and processed image data from the image data converting circuit, and configured to store synthesized and processed image data for the entire processed, synthesized image; and an image printer capable of printing both color and monochrome images, the image printer being configured to print a synthesized image based upon the synthesized image data after it has been processed by the selection input device.

22. The imaging device of claim 21, and further comprising:

an image selector configured to read component-image data for at least two of the plurality of different component-images from the storage unit, and configured to successively supply the component-image data for each of the at least two component-images to the image synthesizer; and a subject-image memory configured to store color subject image data from the camera, and configured to supply the stored color subject image data to the image synthesizer, wherein the subject-image memory and the image synthesizer are configured to successively synthesize the subject image data for the subject image with the component-image data for each successively supplied component image to respectively form synthesized image data for at least two synthesized images;

wherein the synthesized-image memory is configured to simultaneously store synthesized and processed image data for all of the at least two synthesized images.

23. The imaging device of claim 21, and further comprising an image selector configured to read selected component-image data from the storage unit, and configured to supply the selected component-image data to the image synthesizer.

24. The imaging device of claim 22, wherein the image printer prints an image including a plurality of each of the different processed synthesized images having synthesized image data stored in the synthesized-image memory.

25. The imaging device of claim 21, and further comprising:

an input device configured for the subject to give an instruction to start the timing of the camera's imaging;

a textual display configured to communicate the timing of the camera's imaging; and a speaker circuit configured to communicate the timing of the camera's imaging in synchronization with the textual display.

26. An imaging device for forming a single image including a plurality of different synthesized images of a subject, comprising:

a camera for imaging the subject to form subject image data for a subject image;

a storage unit that stores component-image data for a plurality of different component-images;

an image selector configured to read component-image data for at least two different component-images of the plurality of different component-images from the storage unit;

an image synthesizer configured to receive the component-image data for the at least two different component-images from the image selector, and to successively synthesize the subject image data for the subject image with the component-image data for each of the at least two different component-images to respectively form synthesized image data for at least two different synthesized images; and an image producing apparatus for producing viewable images;

wherein the image producing apparatus is configured to produce an image that separately includes at least one of each of the at least two different synthesized images.

27. The imaging device of claim 26, wherein:

the image producing apparatus includes a memory configured to store the synthesized image data for the at least two different synthesized images; and the image synthesizer and the image producing apparatus are configured to reduce the size of the synthesized image data for each of the different synthesized images prior to storing the synthesized image data for each different synthesized image in the memory.

28. The imaging device of claim 26, wherein:

the image selector is configured to select component-image data for four different component-images from the storage unit for synthesizing with the subject image data for the subject image;

the image synthesizer is configured to successively synthesize the subject image data for the subject image with the component-image data for each of the four different component-images to respectively form synthesized image data for four different synthesized images; and the image producing apparatus is configured to produce an image that includes four of each of the four different synthesized images.

29. The imaging device of claim 26, wherein:

the image selector is configured to select component-image data for four different component-images from the storage unit for synthesizing with the subject image data for the subject image;

the image synthesizer is configured to successively synthesize the subject image data for the subject image with the component-image data for each of the four different component-images to respectively form synthesized image data for four different synthesized images;

the image producing apparatus is configured to produce an image that includes four of each of the four different synthesized images;

the image producing apparatus includes a memory configured to store all four of the different synthesized images; and the image producing apparatus includes a printer.

30. The imaging device of claim 28, wherein:

the image producing apparatus includes a memory configured to store the synthesized image data for the four different synthesized images; and the image synthesizer and the image producing apparatus are configured to reduce the size of the synthesized image data, for each of the four different synthesized images, to one-quarter the size thereof prior to storing the synthesized image data for that synthesized image in the memory.

31. The imaging device of claim 26, wherein the image producing apparatus includes a memory configured to store the synthesized image data for the at least two different synthesized images.

32. The imaging device of claim 26, wherein the image producing apparatus includes a printer.

33. The imaging device of claim 26, wherein the image producing apparatus is configured to produce an image that includes a plurality of each of the at least two different synthesized images.

* * * * *